Nov. 5, 1974  F. D. SHAW  3,846,179
BATTERY CELL SPACER
Filed Sept. 11, 1972  2 Sheets-Sheet 2
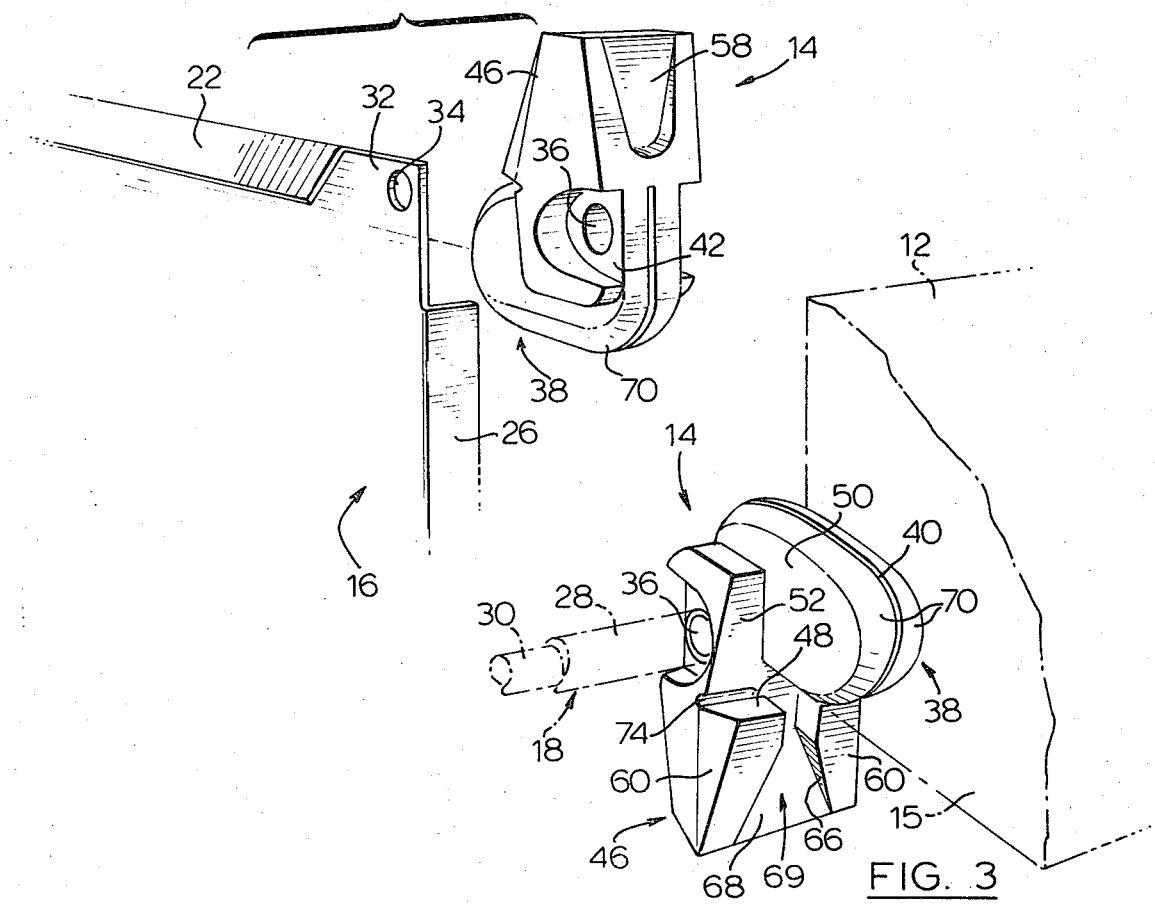
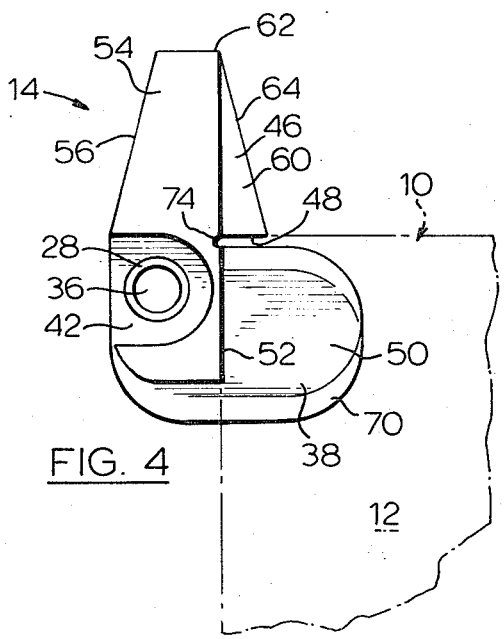
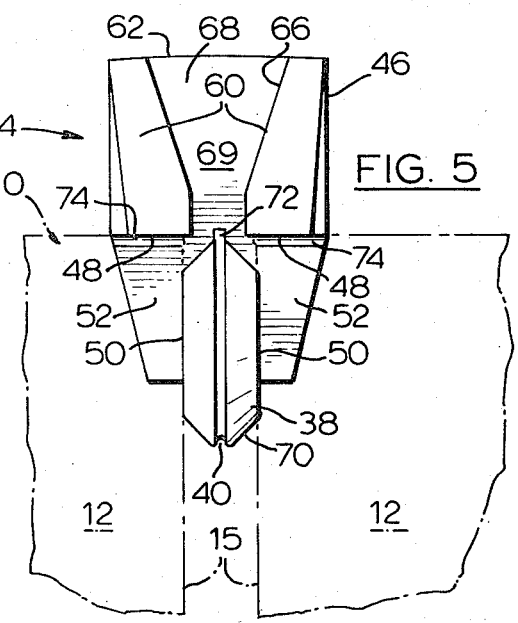

United States Patent Office 3,846,179
Patented Nov. 5, 1974

3,846,179
BATTERY CELL SPACER
Frank Donald Shaw, Toronto, Ontario, Canada, assignor to Saft Batteries Limited, Toronto, Ontario, Canada
Filed Sept. 11, 1972, Ser. No. 287,696
Claims priority, application Canada, Aug. 16, 1972, 149,520
Int. Cl. H01m 1/04
U.S. Cl. 136—171                      7 Claims

ABSTRACT OF THE DISCLOSURE

A spacer for use in an assembly of spaced apart voltaic cells comprises a first and second body portion disposed along a longitudinal axis. A groove is formed around a substantial portion of the periphery of the first body portion and each side thereof is beveled. The sides of the first body portion are perpendicular to a first surface of the second body portion, and a second surface of the second body portion carries at least one inclined raised surface extending towards said first body portion and ending before said first body portion in at least one third surface which is substantially perpendicular to the first surface and to the sides, the third surface extending beyond at least one side of the first body portion. A hole is located outwardly of the first surface and passes through said first body portion substantially perpendicular to the sides thereof. An assembly of spaced apart voltaic cells wherein the spacer is used.

FIELD OF INVENTION

This invention relates to a spacer used in an assembly of spaced apart voltaic cells.

BACKGROUND OF INVENTION

Voltaic cells commonly used to power electrical circuits, motors, etc., are usually placed together in an assembly to form a battery pack of cells. Each cell usually comprises a steel container into which the appropriate plates and spacers, and electrolyte, are placed; and the container may be plated or painted. In any event, when assembling a battery pack, care must be exercised to insulate each voltaic cell from the others in order to eliminate dielectric currents passing from one cell to another, as may especially happen in a humid atmosphere, from water dropping on the upper surface of the battery, or from an overflow of electrolyte during voltaic cell filling. An effective way of insulating the cells one from another, is by spacing them apart so that there is an air space between each cell. This is commonly done by constructing chemically impregnated wooden frames in which individual voltaic cells are suspended by use of insulating knobs or lugs, thereby ensuring dissipation of moisture and heat which may build up between the cells and effectively precluding dielectric currents. However, such wooden frames have a major disadvantage after a period of time in that the wood may deteriorate in spite of the chemical impregnation. Such deterioration of the wood is usually caused by excess moisture, traces of electrolyte lying on flat surfaces, or the attack of various insect parasites.

Another method of insulating voltaic cells one from another is by coating each cell with a thick layer of ebonite or synthetic rubber and then molding these cells into a battery pack where the battery may be placed in an appropriate case and wedged to secure it in position. The disadvantage of this method is that the synthetic rubber or ebonite tends to decompose after a period of service due to oxidation of the rubber, swelling of the synthetic material due to moisture impregnation, or internal cell expansion possibly causing the synthetic material to burst. As a result, this type of battery must be discarded because after one of the voltaic cells in the battery has become inoperative that one particular cell cannot be replaced, even though the remaining voltaic cells within the battery may be still in good condition.

In view of such disadvantages of the above techniques in assembling a battery pack, a battery spacer has been developed which insulates each voltaic cell from adjacent cells in a battery pack by providing an air space between each cell. This type of spacer is disclosed in U.S. Pat. 3,664,877 wherein a plurality of structurally simple insulator spacers are used to support multicell batteries and to retain the battery in assembled form; yet the battery pack can be easily dismantled so that more voltaic cells may be added to the battery, or so that a defective cell may be replaced.

The spacer referred to above does not facilitate electrolyte or moisture run-off when electrically conductive liquid spills over the surface of the cell onto the spacer. In addition, the end plates used in the particular battery assembly using that spacer require that the spacer be glued or fastened to the corners thereof, so that the assembly may be completed. This is an awkward method of assembly and may lead to a broken battery pack since the end place may easily tear away from the spacers attached to the corners thereof.

Another type of voltaic cell spacer is formed of an extruded length of plastic and runs the length of the storage battery assembly along each outer edge of the cells of the assembly, and is held in position by end plates in the voltaic cells being placed within the extruded spacers. However, when it is desired to add additional cells to the battery pack due to further requirements, a new extruded length of spacer for each corner of the assembly must be formed in order to accommodate the additional cells. In addition, this type of extruded spacer accommodated only the one size of cell that it is made for; and when it is desired to form an assembly of different shaped or sized voltaic cells, a different size of extruded length of spacer must be formed.

The spacer of this invention has been designed so as to overcome the above-noted problems. The spacer has a first and second body portion disposed along the longitudinal axis of the spacer where the first body portion has a groove extending substantially around the periphery thereof. Two vertically disposed and parallel sides of the first body portion are substantially perpendicular to a first surface of the second body portion and a second surface of the second body portion carries at least one inclined raised surface extending towards the first body portion and ending before the first body portion in at least one third surface which is substantially perpendicular to the first surface and to the sides, and extends beyond at least one side of the first body portion. A groove may be located at the base of each third surface.

A hole is located outwardly of the first surface and passes through part of the first body portion substantially perpendicular to the sides. This type of spacer may accommodate any type of rectangular, vertically disposed voltaic cell. The spacers lying along the bottom portion of the storage battery utilize the second body portion as a supporting standard to provide an insulating air space beneath the voltaic cells. In addition, an insulating air space is provided between each adjacent vertical set of voltaic cell walls and also between the end plates and the adjacent voltaic cell end walls. In order to assemble the end plates, the spacer of this invention is slit longitudinally along the first body portion, and each corner of the end plate is inserted in a respective one of the slit spacers where the corner of the end plate has a hole communicating with the hole within the spacer. A threaded rod is passed through the aligned set of spacers at each corner of the assembly and fastening means are used to bring the spacers into compression. As a result, the end plates are securely held to the assembly so that if the storage battery is dropped, the end plate will not break away from the assembly.

In order to facilitate electrolyte run-off of the spacer thereby reducing the hazard of leakage currents between adjacent cells, a groove around the first body portion breaks the surface tension of any excess electrolyte or moisture so that it may be easily run off. Therefore, liquid gathering between spaced-apart voltaic cells is substantially reduced. In addition, grooves are provided along the base of the third surface so that electrolyte gathering at the upper surface of the cell may also run horizontally along these surface tension breaking grooves and down the sides of the cells.

SUMMARY OF THE INVENTION

It is an object of the invention to provide a spacer for use in an assembly of spaced-apart voltaic cells where the spacer provides liquid run-off passageways.

It is another object of the invention to provide a spacer used in an assembly of spaced apart voltaic cells of a construction so as to secure the end plates to the storage battery.

It is a further object of the invention to provide an assembly of spaced apart voltaic cells where the assembly may be easily dismantled so that further cells may be added to the storage battery or defective cells replaced.

BRIEF DESCRIPTION OF THE DRAWINGS

These and other features of the invention are discussed in greater detail hereinafter in association with the accompanying drawings in which:

FIG. 2 is a perspective view of the battery pack end plate on the upper corner of which a slot spacer according to this invention is placed;

FIG. 3 is a detailed perspective view of a spacer according to this invention having a rod passing therethrough, and on which a lower corner of a voltaic cell is placed;

FIG. 4 is a side elevation view of a spacer resting on an upper corner of a voltaic cell;

FIG. 5 is a front elevation view of a spacer placed between two adjacent voltaic cells and resting on the upper corners thereof.

DETAILED DESCRIPTION OF THE PREFERRED EMBODIMENTS

Figure 1:
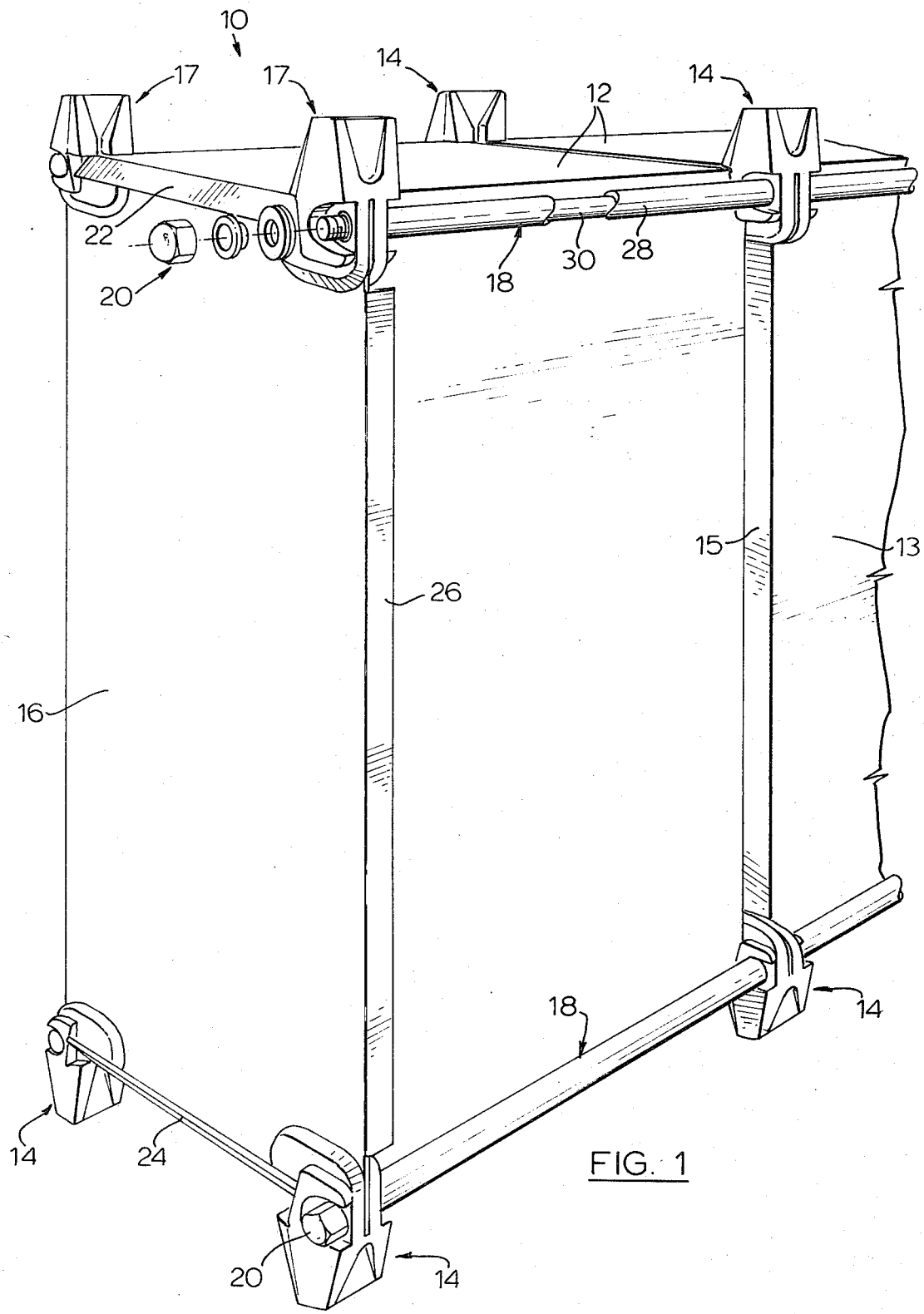
FIG. 1 is a perspective view of parts of a battery pack assembly of cells, connected at spaced intervals according to the invention.

The battery spacer according to this invention and discussed hereinafter in more detail may be used to space apart any number of voltaic cells of any size. An example of an application of the spacer is shown in FIG. 1 of the drawings. A battery pack 10 comprises a plurality of voltaic cells 12 having vertically disposed front walls 13 and side walls 15. The cells 12 are spaced apart by spacers generally designated at 14, the end sides of the end voltaic cells being spaced from end plates 16 by end spacers 17. Rods 18 are passed through each set of aligned spacers 14 and at each end thereof fastening means generally designated at 20 compress the aligned spacers 14 between each adjacent set of cells and the spacers 17 between the end cells and the end plates 16.

Each end plate 16 has outwardly turned lips 22 and 24 at the top and bottom thereof, respectively. These lips provide finger grips thereby facilitating handling of the battery pack 10. The lower lip 24 is provided to accommodate a tool used in lifting the storage battery 10 and also to eliminate the need during assembly to determine the top or bottom portion of the end plate 16. Side lips 26 are also provided on the end plate 16 so as to partially contain the vertical end corners of each end cell. The end plate may be formed from mild steel and coated with a corrosion resistant paint, or the plate may be formed or other suitable materials such as rigid plastics.

The rod 18 may have a protective coating 28 thereon so as to protect the metal 30 of the rod. This protective coating may be any plastic or other inert material which would resist corrosion caused by a combination of electrolyte spills, moisture and dielectric currents.

FIG. 2 illustrates in more detail how the end plate 16 is securely fastened to form the storage battery 10. The outwardly turned lip 22 does not extend the full width of the end plate thereby leaving an exposed straight edge 32. A hole 34 is drilled in the corner of the end plate so as to correspond with the hole 36 in the spacer 14. A first body portion 38 of the spacer 14 is slit longitudinally along a groove 40 running substantially around the periphery of the first body portion 38. In slitting the first body portion 38, the slit is deep enough so as to communicate with hole 36 and when the spacer 14 is placed over the corner of the end plate 16, the straight edge 32 is allowed to move along the uppermost portion of the slit so that the hole 36 of the spacer 14 may be aligned with the hole 34 in the end plate. The slide lips 26 do not extend the full height of the end plate 16 thereby allowing clearance for the first body portion 38 to slide, without interference, onto the corner of the end plate 16.

In assembling the battery pack, each rod 18 is passed through a set of aligned spacers 14 including end spacers 17, and fastening means 20 is brought to bear on surfaces 42 so as to securely hold the end spacers 17 to the end plates 16 by way of the rod passing through the holes 34 and 36.

FIG. 3 shows a lower spacer 14 supporting a lower corner of one of the voltaic cells 12 having a vertically disposed side wall 15. The voltaic cell 12 is supported above a supporting surface by a second body portion 46 of the spacer 14 thereby allowing free air circulation beneath the voltaic cell 12. The first and second body portions are disposed along a longitudinal axis of the spacer 14. The voltaic cell 12 rests on a ledge 48 and the cell side wall 15 bears against a side 50 of the first body portion of the spacer 14. The front wall 13 of the battery cell 12 also bears against a surface 52. Therefore, surfaces 48, 50 and 52 are mutually perpendicular to each other, thereby accommodating any square corner of any voltaic cell 12. The hole 36 passes through a part of the first body portion 38 in a direction perpendicular to the sides 50; and is located outwardly of the surfaces 52. Rotation of the spacer 14 about the rod 18 essentially precluded, since surfaces 48 and 52 when in contact with the corresponding surfaces of the voltaic cell 12 counteract any rotation about the axis of the rod and surfaces 50 and 52 counteract any rotation of the spacer about its longitudinal axis. As a result, any voltaic cell movement relative to the others is precluded unless the rod 18 is removed from the spacers.

FIGS. 4 and 5 show an upper spacer where the mutually perpendicular surfaces 48, 50 and 52 bear against an upper corner of a voltaic cell 12. The second body portion 46 of the spacer 14 has a sloped skirt 54 on each side thereof. The back surface 56 is also sloped and may have a depression 58 as shown in FIG. 2. Two wing-like portions 60 are inclined from the outer edge surface 62 towards the first body portion, and each wing-like portion 60 ends in a flat surface 48. The side 64 of each wing-like portion is sloped towards the surface 54 and the inner surface 66 of the wing-like portion extends towards a flat surface 68 of the second body portion. The surfaces 66 and 68 define an open channel 69 which extends from the outer edge surfaces 62 towards the first body portion and within the same plane as surfaces 52. It is realized that channel 69 may also define a plane which may be parallel to or at an angle to the plane defined by the surfaces 52. The periphery of each side 50 is beveled and appears as sloped surface 70.

A groove 40 is formed around a substantial portion of the periphery of the first body portion 38 and extends into the second body portion as noted at 72 in FIG. 5. A groove 74 may also be formed along the base of the surface 48; and may extend from the outer portion of surface 52 inwardly beyond the plane defined by surface 50.

Filing the voltaic cells with electrolyte may quite often result in the electrolyte being spilled over the top of the cell and splashed against the spacers 14. Considering the upper spacer in such circumstances, if electrolyte splashes against the surface 68 it would fall downwardly via channel 69 towards the beveled surfaces 70 and upwardly extending groove 72. The upwardly extending groove 72 assists in bringing the surface tension of the liquid, thereby encouraging the electrolyte to flow along the groove 40 to the bottom portion of an upper spacer. If the quantity of electrolyte being channelled towards the groove 72 is sufficient to overflow the groove 40, the beveled surfaces 70 then encourage the electrolyte to flow along the side walls of the cell and downwardly away therefrom. In addition, grooves 74 extend into the area where the electrolyte is collecting around groove 72 so that these grooves may also break the surface tension of the excess electrolyte and encourage the electrolyte to flow behind the cells 12 and away therefrom. As a result, the design of the spacer provides passageways for the eletrolyte to flow away from adjacent cell faces.

The spacer as shown in the lower position in FIG. 3, utilizes the same grooves 40 and 74 in conjunction with the beveled surfaces 70 and the open channel 69 to allow passage of excess liquid away therefrom. The external surfaces such as 54 and 64 are all sloped so as to ensure that spilled electrolyte or excess moisture does not collect on those surfaces. In adidtion, the upper surface 62 may be curved as shown in FIG. 5 so as to encourage the electrolyte to flow off of this surface when the spacer is in the upper portion of the assembly as shown in FIG. 5.

Cells 12 may be of various types of construction. However, in any large industrial application it is common to find that a cell 12 has steel walls having corrosion resistant paint applied to the outside thereof.

It can be seen that the spacer 14 of this invention facilitates the assembly of a plurality of voltaic cells where the spacers at the ends of the assembly are securely fastened to the end plates and in turn, the end plates are secured to the assembly to form a rigid battery of cells, or battery pack. In addition, it will be noted that the battery pack may be easily disassembled at any time so that more cells may be added to the battery pack, or so that damaged or defective cells may be replaced with fresh ones.

While various embodiments of the invention have been illustrated and described, it will be understood that the variations therein may be made as will be apparent to those skilled in the art without departing from the spirit of the invention or scope of the appended claims.

What I claim is:

1. For use in an assembly of spaced apart voltaic cells, each of said cells having vertically disposed front and side walls, where said front walls are substantially aligned relative to one another; a spacer comprising:
    first and second body portions disposed along a longitudinal axis of said spacer;
    two vertically disposed and parallel sides of said first body portion being substantially perpendicular to a first surface of said second body portion;
    a second surface of said second body portion carrying at least one inclined raised surface extending towards said first body portion and ending before said first body portion in at least one third surface which is substantially perpendicular to said first surface and to said sides, and which extends beyond at least one side of said first body portion; and
    a hole located outwardly of said first surface and passing through said first body portion substantially perpendicular to said sides.

2. A spacer of claim 1 where a first groove extends substantially around the periphery of said first body portion; and where a second groove extends along the base of each of said third surfaces.

3. The spacer of claim 2 where each of said sides of said first body portion is beveled along a substantial portion thereof.

4. A spacer of claim 1 where said second surface lies in the same plane of said first surface and carries two wing-like raised inclined surfaces extending towards said first body portion, each wing-like surface ending as one of said at least one third surfaces; the area between said two wing-like surfaces defining an open channel communicating with said first groove.

5. An assembly of spaced apart voltaic cells, each cell having vertically disposed front and side walls and the front walls being substantially aligned relative to one another; including a plurality of cell spacers, an end plate at each end of said assembly, and a plurality of rods; each of said spacers being spaced between each adjacent pair of cell corners so that said spacers are an aligned set relative to each other along the length of each corner of said assembly, and each spacer comprising:
    first and second body portions disposed along a longitudinal axis of said spacer;
    two vertically disposed and parallel sides of said first body portion being substantially perpendicular to a first surface of said second body portion;
    a second surface of said second body portion carrying at least one inclined raised surface extending towards said first body portion and ending before said first body portion in at least one third surface which is substantially perpendicular to said first surface and to said sides, and which extends beyond at least one side of said first body portion; and
    a hole located outwardly of said first surface and passing through said first body portion substantially perpendicular to said sides;
each of said rods passing through an aligned set of holes in each of said aligned set of spacers and through corresponding holes in said end plates; and fastening means at each end of said rod to maintain each said aligned set of spacers in compression.

6. An assembly of claim 5, where said first body portion is slit longitudinally and parallel to said surfaces so that said hole and slit are communicating; each corner of said end plate being inserted in each said slit spacer where said end plate has a hole therein corresponding to the hole in said spacer.

7. An assembly of claim 5 where said rod is coated with a corrosion resistant material.

References Cited
UNITED STATES PATENTS

| | | | |
|---|---|---|---|
| 3,623,917 | 12/1969 | Chassoux | 136—171 |
| 3,692,588 | 9/1972 | Chamadon | 136—181 |
| 3,664,877 | 5/1972 | Shaw | 136—171 |

DONALD L. WALTON, Primary Examiner

U.S. Cl. X.R.

136—181